(12) United States Patent
Glennon et al.

(10) Patent No.: US 12,619,202 B2
(45) Date of Patent: May 5, 2026

(54) POWER TOOL STALL DETECTION

(71) Applicant: MILWAUKEE ELECTRIC TOOL CORPORATION, Brookfield, WI (US)

(72) Inventors: Jack J. Glennon, Milwaukee, WI (US); Lokeshwaran Rajendran, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 4 days.

(21) Appl. No.: 18/311,452

(22) Filed: May 3, 2023

(65) Prior Publication Data

US 2023/0367269 A1 Nov. 16, 2023

Related U.S. Application Data

(60) Provisional application No. 63/340,671, filed on May 11, 2022.

(51) Int. Cl.

| | |
|---|---|
| B25F 5/00 | (2006.01) |
| B24B 49/14 | (2006.01) |
| B25C 1/06 | (2006.01) |
| G05B 13/02 | (2006.01) |
| B24B 49/00 | (2012.01) |

(Continued)

(52) U.S. Cl.
CPC ............ G05B 13/0265 (2013.01); B25F 5/00 (2013.01); B24B 49/006 (2013.01); B24B 49/10 (2013.01); B24B 49/14 (2013.01); B25C 1/047 (2013.01); B25C 1/06 (2013.01)

(58) Field of Classification Search
CPC ......... B25F 5/00; B24B 49/006; B24B 49/10; B24B 49/14; B25C 1/047; B25C 1/06; B23Q 17/007; G05B 13/0265; H02P 29/024
See application file for complete search history.

(56) References Cited

U.S. PATENT DOCUMENTS

| | | | | |
|---|---|---|---|---|
| 10,523,087 | B2 * | 12/2019 | Lewis | .................... B24B 23/028 |
| 10,879,831 | B1 * | 12/2020 | Nagel | ................ G05B 13/0265 |

(Continued)

FOREIGN PATENT DOCUMENTS

| | | | | |
|---|---|---|---|---|
| JP | 2023519125 | * | 5/2023 | ................ B25F 5/00 |
| WO | WO-2012061673 A2 | * | 5/2012 | ................ B25F 5/00 |
| WO | WO-2023085712 A1 | * | 5/2023 | ........... G06F 1/1624 |

*Primary Examiner* — Linda J. Hodge

(74) *Attorney, Agent, or Firm* — Michael Best & Friedrich LLP

(57) ABSTRACT

A power tool includes a housing, a motor supported by the housing, a battery pack interface configured to receive a battery pack, a plurality of sensors configured to generate sensor data indicative of an operational state of the power tool, and an electronic controller. The electronic controller includes an electronic processor and a memory. The memory includes a machine learning control program for execution by the electronic processor. The electronic controller is configured to receive the sensor data indicative of the operational state of the power tool, process the sensor data using the machine learning control program to determine whether the power tool is experiencing a stall condition, and disable the motor when the power tool is determined to be experiencing the stall condition.

17 Claims, 9 Drawing Sheets

(51) Int. Cl.
    *B24B 49/10*       (2006.01)
    *B25C 1/04*       (2006.01)

(56)         References Cited

U.S. PATENT DOCUMENTS

2011/0227430 A1*  9/2011  Omori .................... H02K 11/33
                                      310/50
2017/0234484 A1*  8/2017  Vanko ................... B24B 23/028
                                    173/176
2019/0227528 A1*  7/2019  Abbott ............... G05B 13/0265
2019/0250206 A1*  8/2019  Noguchi ............. G06F 16/9035
2022/0181969 A1*  6/2022  Toyoda ............. H02M 7/53871
2022/0355453 A1*  11/2022  Morimura ................. B25C 1/06
2022/0379430 A1*  12/2022  Kahari .................... B24B 49/10

* cited by examiner

POWER TOOL STALL DETECTION

RELATED APPLICATIONS

This application claims the benefit of U.S. Provisional Patent Application No. 63/340,671, filed May 11, 2022, the entire content of which is hereby incorporated by reference.

FIELD

Embodiments described herein relate to power tools.

SUMMARY

Motor stall conditions in a power tool can lead to overheating of the motor, which can permanently damage the motor. In higher power tools, such as some fastener drivers and sanders, the motor overheating is a greater issue due to size constraints that limit passive heatsinking. Additionally, for some fastener drivers (e.g., nailers), detecting a motor stall condition is complicated because a firing sequence initially appears to be a stall condition without actually being a stall condition. Detecting or identifying a stall condition can prevent nuisance dead trigger pulls and improve reliability by reducing the number of false positive stall condition detections. Additionally, cold temperatures make stall detection non-trivial because a cold firing mechanism (or other power tool mechanism) can increase loading significantly. Stall detection should be able to distinguish between a cold mechanism for the power tool from a motor stall condition to increase power tool usability at lower temperatures. Similar issues are experienced by other power tools, such as an orbital sander, that includes a large fan that is driven by the motor.

Power tools described herein include a housing, a motor supported by the housing, a battery pack interface configured to receive a battery pack, a plurality of sensors configured to generate sensor data indicative of an operational state of the power tool, and an electronic controller. The electronic controller includes an electronic processor and a memory. The memory includes a machine learning control program for execution by the electronic processor. The electronic controller is configured to receive the sensor data indicative of the operational state of the power tool, process the sensor data using the machine learning control program to determine whether the power tool is experiencing a stall condition, and disable the motor when the power tool is determined to be experiencing the stall condition.

In some aspects, the power tool is a fastener driver.

In some aspects, the plurality of sensors include a voltage sensor, a current sensor, a speed sensor, and a motion sensor.

In some aspects, the power tool further includes the motion sensor is selected from a group consisting of an accelerometer, a gyroscope, and an inertial measurement unit.

In some aspects, the power tool is a sander.

In some aspects, the plurality of sensors include a temperature sensor and a current sensor.

In some aspects, the power tool further includes the machine learning controller implements one or more of the group consisting of a decision tree learning, an artificial neural network, a recurrent artificial neural network, a long short term memory neural network, a support vector machine, clustering, a Bayesian network, reinforcement learning, representation learning, similarity and metric learning, sparse dictionary learning, and k-nearest neighbor (KNN).

Methods of operating a power tool described herein include generating, by a plurality of sensors, sensor data sensor data indicative of an operational state of the power tool, receiving, by an electronic controller of the power tool, the sensor data indicative of the operational state of the power tool, processing, by the electronic processor, the sensor data using a machine learning control program to determine whether the power tool is experiencing a stall condition of the motor, and disabling a motor when the power tool is determined to be experiencing the stall condition of the motor.

In some aspects, the power tool is a fastener driver.

In some aspects, the plurality of sensors include a voltage sensor, a current sensor, a speed sensor, and a motion sensor.

In some aspects, the motion sensor is selected from a group consisting of an accelerometer, a gyroscope, and an inertial measurement unit.

In some aspects, the power tool is a sander.

In some aspects, the plurality of sensors include a temperature sensor and a current sensor.

In some aspects, the machine learning controller implements one or more of the group consisting of a decision tree learning, an artificial neural network, a recurrent artificial neural network, a long short term memory neural network, a support vector machine, clustering, a Bayesian network, reinforcement learning, representation learning, similarity and metric learning, sparse dictionary learning, and k-nearest neighbor (KNN).

Power tools described herein include a housing, a motor supported by the housing, a battery pack interface configured to receive a battery pack, a plurality of sensors configured to generate sensor data indicative of an operational state of the power tool, and an electronic controller. The electronic controller includes an electronic processor and a memory. The memory includes a machine learning control program for execution by the electronic processor. The electronic controller is configured to receive the sensor data indicative of the operational state of the power tool, process the sensor data using the machine learning control program to determine whether the motor is experiencing a stall condition, and disable the motor when the motor is determined to be experiencing the stall condition.

In some aspects, the power tool is a fastener driver.

In some aspects, the plurality of sensors include a voltage sensor, a current sensor, a speed sensor, and a motion sensor.

In some aspects, the power tool is a sander.

In some aspects, the plurality of sensors include a temperature sensor and a current sensor.

In some aspects, the machine learning controller implements one or more of the group consisting of a decision tree learning, an artificial neural network, a recurrent artificial neural network, a long short term memory neural network, a support vector machine, clustering, a Bayesian network, reinforcement learning, representation learning, similarity and metric learning, sparse dictionary learning, and k-nearest neighbor (KNN).

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein relate to motor stall detection of a motor (e.g., a brushless direct current ["BLDC"] motor) in a power tool, such as a fastener driver (e.g., a nailer) or sander (e.g., an orbital sander).

Figure 1:
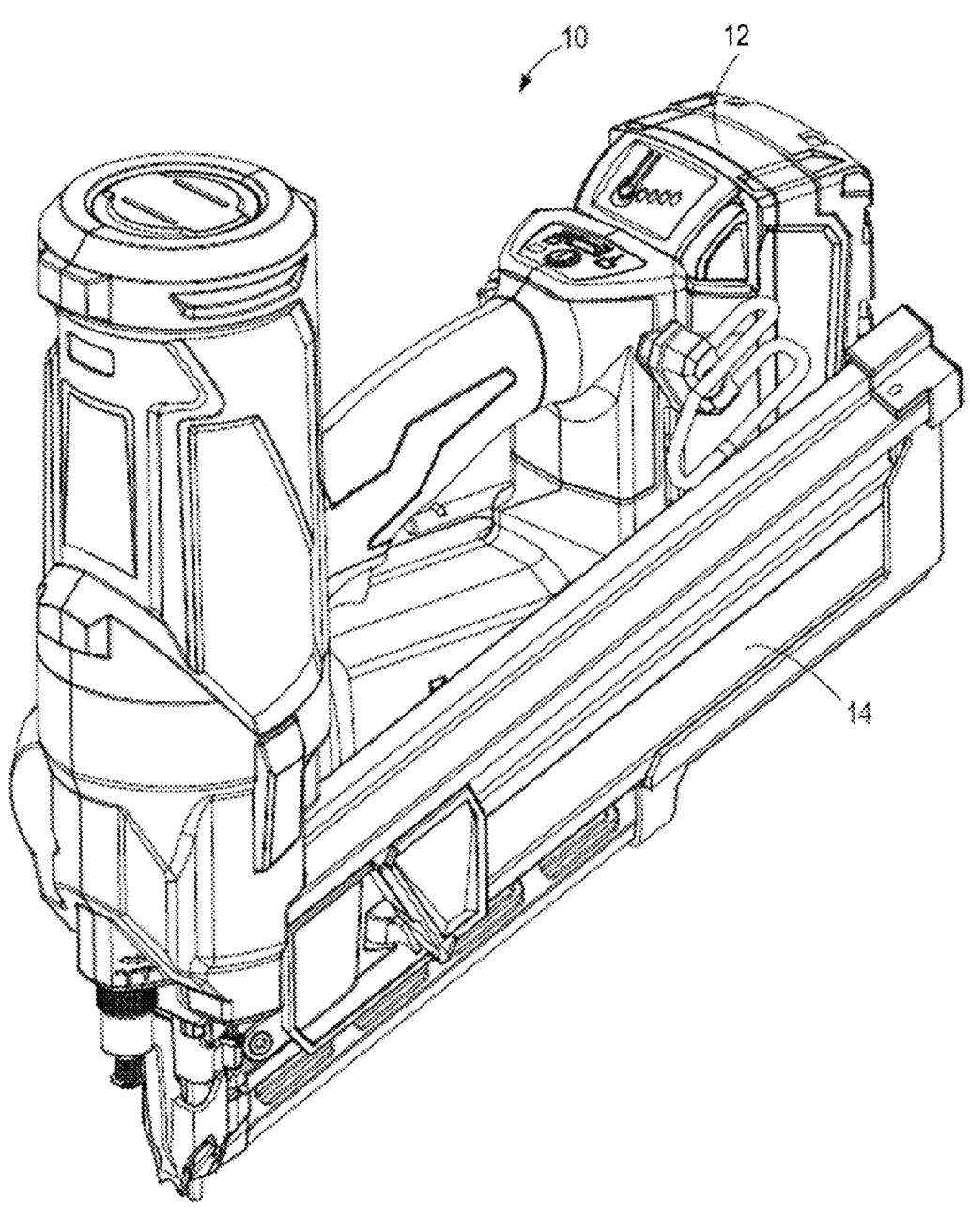
FIG. 1 illustrates a nailer, according to some embodiments

FIG. 1 illustrates a fastener driver or nailer 10 (e.g., a gas spring-powered nailer) that is operable to drive fasteners (e.g., single-headed nails, double-headed or duplex nails, tacks, staples, etc.) held within a magazine 14 into a workpiece. The nailer 10 is powered by a removable and rechargeable battery pack 12.

Figure 2:
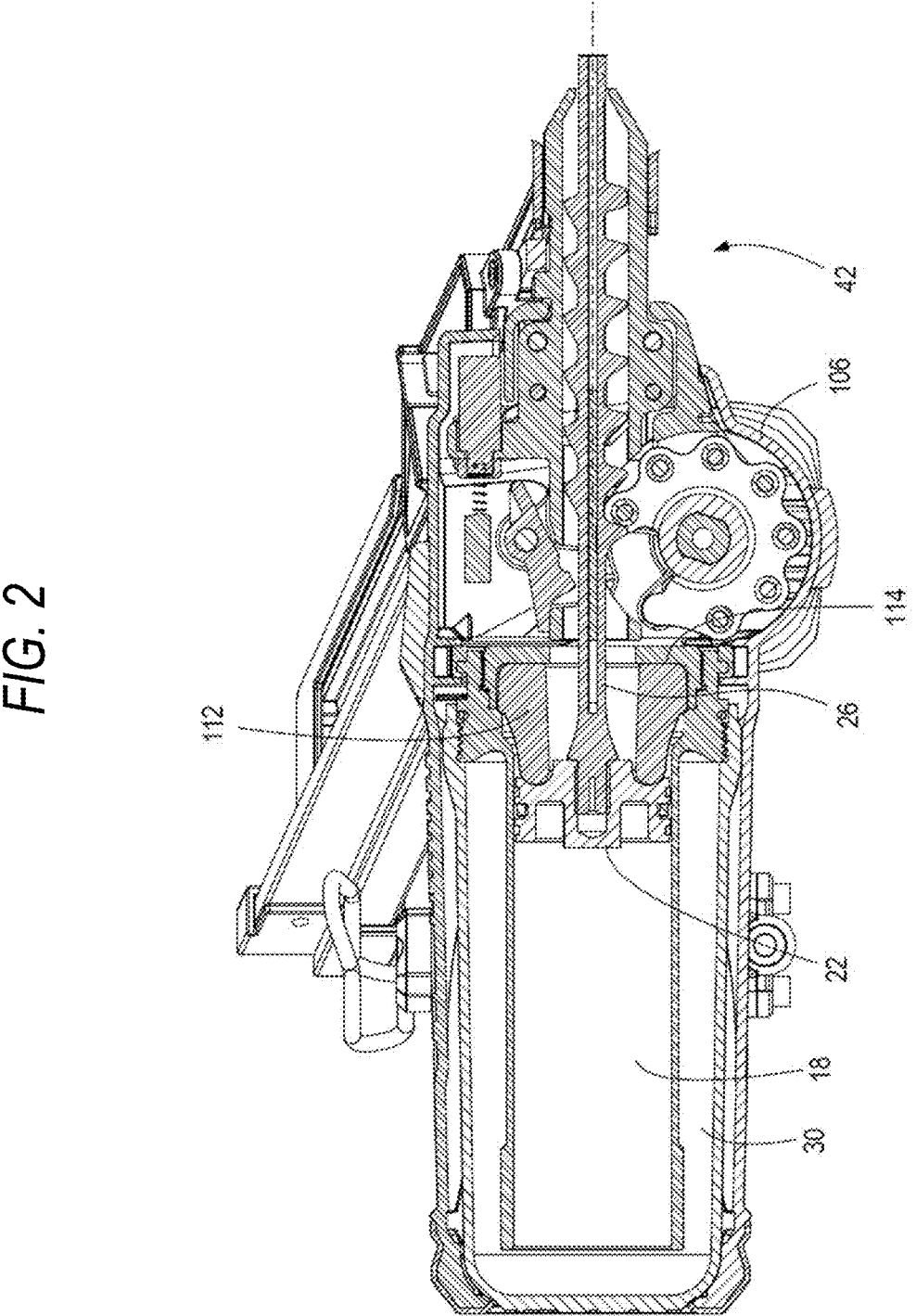
FIG. 2 illustrates a partial cross-sectional view of the nailer of FIG. 1.

With reference to FIG. 2, the nailer 10 does not require an external source of air pressure, but rather includes an outer storage chamber cylinder 30 of pressurized gas in fluid communication with a cylinder 18. In the illustrated embodiment, the cylinder 18 and moveable piston 22 are positioned within the storage chamber cylinder 30. The nailer 10 includes a bumper 112 that is positioned beneath the piston 22 to stop the piston 22 at a driven position and to absorb the impact energy from the piston 22. The bumper 112 is configured to distribute the impact force of the piston 22 uniformly throughout the bumper 112 as the piston 22 is rapidly decelerated upon reaching a driven position (i.e., a bottom dead center position). The bumper 112 is disposed in the cylinder 18 and is clamped into place by a drive mechanism or a lifter housing portion 106, which is threaded to the bottom end of the cylinder 18. As shown, the bumper 112 is received within a cutout 114 that is formed in the lifter housing portion 106. The cutout 114 coaxially aligns the bumper 112 relative to a striker or driver blade 26. Although the term driver blade is used herein, the term striker can be interchangeably used in place of driver blade. The driver blade 26 is configured to move with the piston 22 along the same path of motion (e.g., from top dead center to bottom dead center).

As shown in FIG. 2, the storage chamber cylinder 30 is concentric with the cylinder 18. The cylinder 18 has an annular inner wall that guides the piston 22 and the driver blade 26 along the driving axis 300 to compress the gas in the storage chamber cylinder 30. The storage chamber cylinder 30 has an annular outer wall circumferentially surrounding the inner wall. The cylinder 18 has a threaded section and the storage chamber cylinder 30 has corresponding threads at a lower end of the storage chamber cylinder 30 such that the cylinder 18 is threadably coupled to the storage chamber cylinder 30 at the lower end. As such, the cylinder 18 is configured to be axially secured to the storage chamber cylinder 30.

Figure 3:
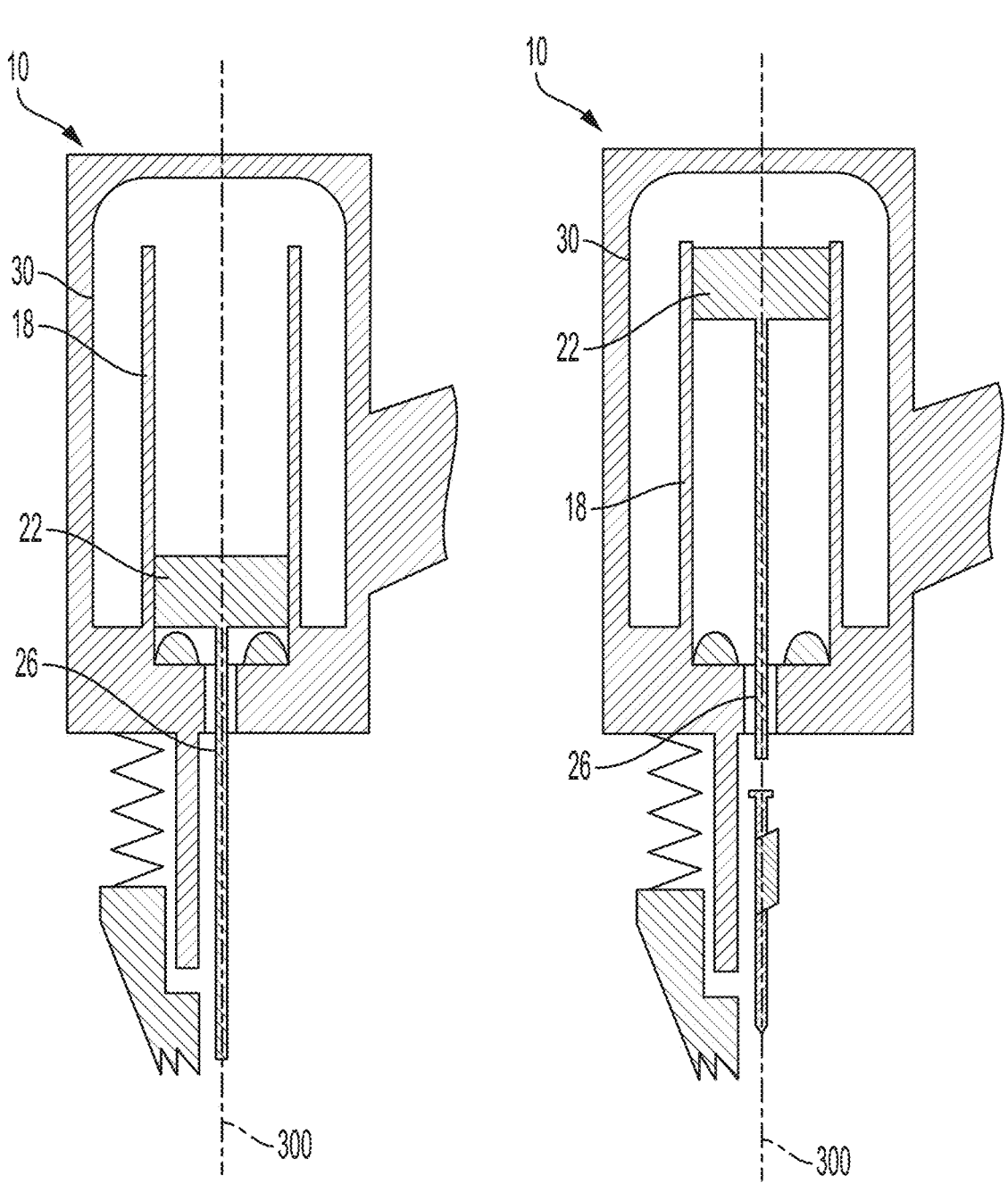
FIG. 3A is a schematic view of the nailer of FIG. 1 illustrating a driver blade in a driven or bottom-dead-center position.
FIG. 3B is a schematic view of the nailer of FIG. 1 illustrating a driver blade in an undriven or top-dead-center position prior to actuation.

FIGS. 3A and 3B illustrate a partial section view of the nailer 10. As previously described with respect to FIG. 2, the nailer 10 includes the cylinder 18 and the piston 22 positioned within outer storage chamber cylinder 30. The piston 22 is configured to drive the driver blade 26. The nailer 10 does not require an external source of air pressure, and instead includes the outer storage chamber cylinder 30 of pressurized fluid (e.g., gas) in communication with the cylinder 18. The driver blade 26 defines a driving axis 300. During a driving cycle, the driver blade 26 and the piston 22 are moveable between a top-dead-center ("TDC") position (as shown in FIG. 3B) and a driven or bottom-dead-center ("BDC") position (as shown in FIG. 3A).

Figure 7:
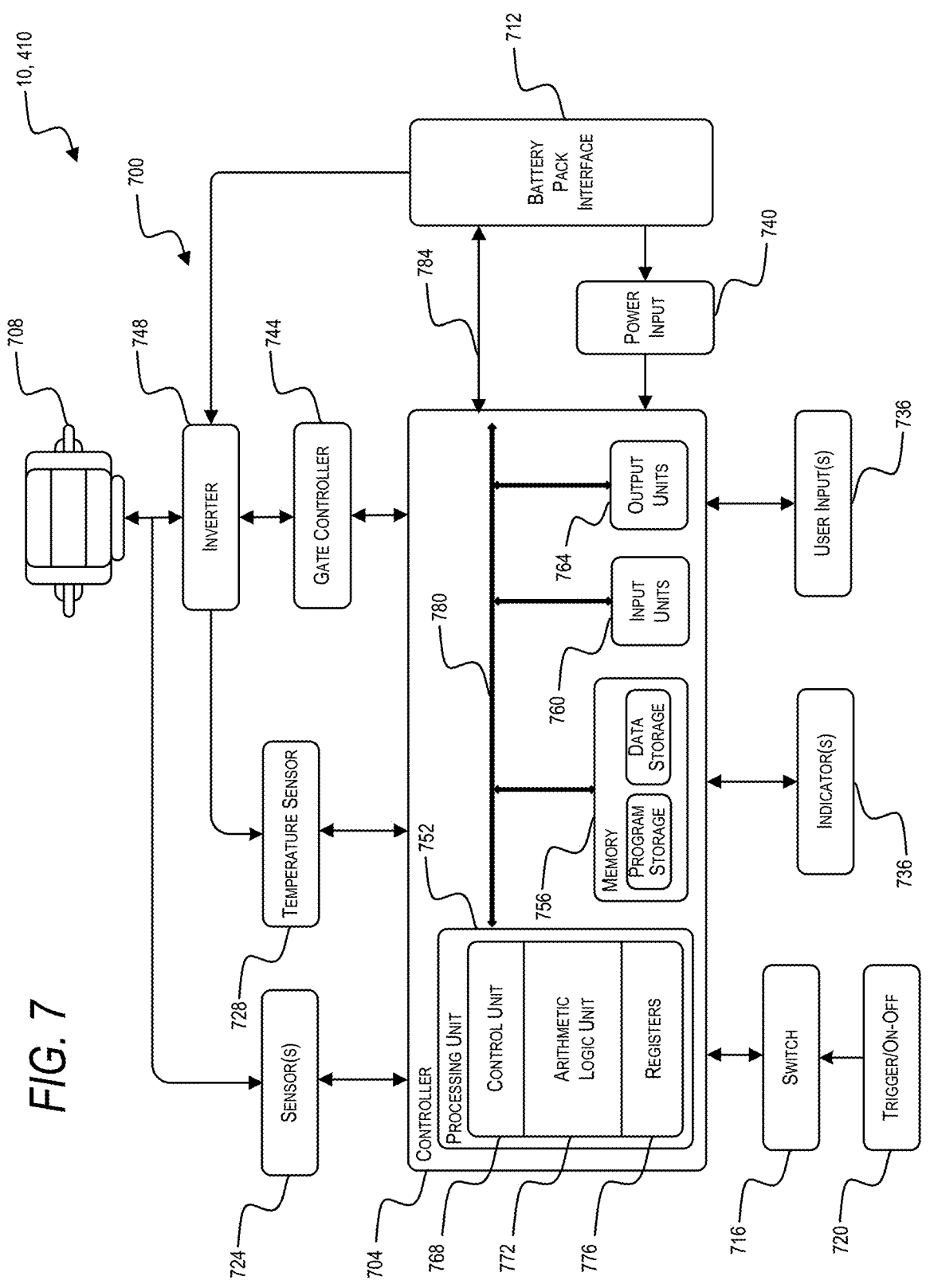
FIG. 7 illustrates a control system for the nailer of FIG. 1 or the sander of FIG. 4, according to some embodiments.

In operation, the lifter housing portion 106 drives the piston 22 and the driver blade 26 toward the TDC position by energizing the motor 708 (see FIG. 7). As the piston 22 and the driver blade 26 are driven toward the TDC position, the gas above the piston 22 and the gas within the storage chamber cylinder 30 is compressed. Prior to reaching the TDC position, the motor 308 is deactivated and the piston 22 and the driver blade 26 are held in a ready position, which is located between the TDC and the BDC positions, until being released by user activation of the trigger 320. When released, the compressed gas above the piston 22 and within the storage chamber cylinder 30 drives the piston 22 and the driver blade 26 to the driven position, thereby driving a fastener into the workpiece. The illustrated nailer 10 therefore operates on a gas spring principle utilizing the lifter housing portion 106 and the piston 22 to further compress the gas within the cylinder 18 and the storage chamber cylinder 30.

Figure 4:
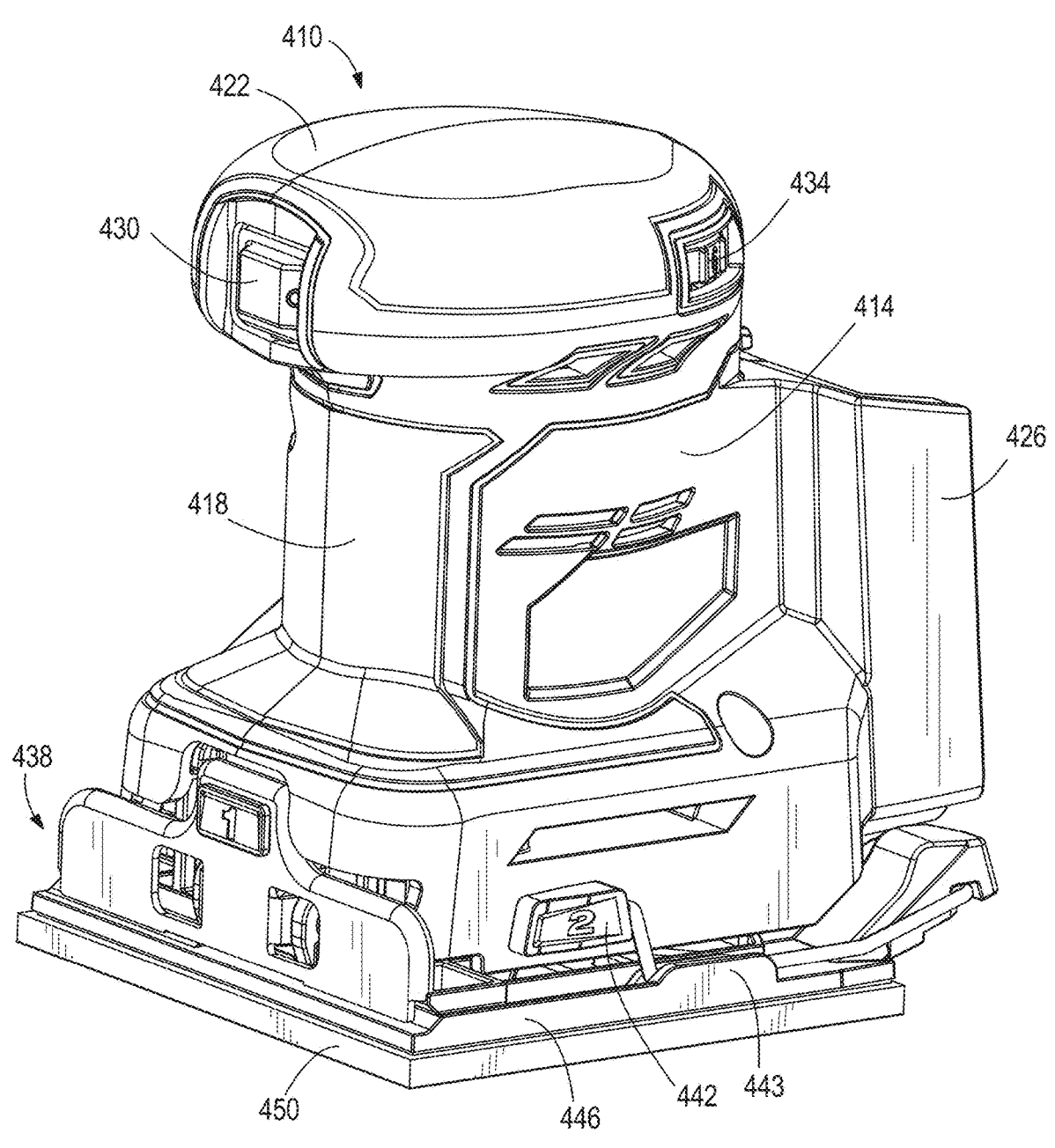
FIG. 4 illustrates a sander, according to some embodiments.
Figure 5:
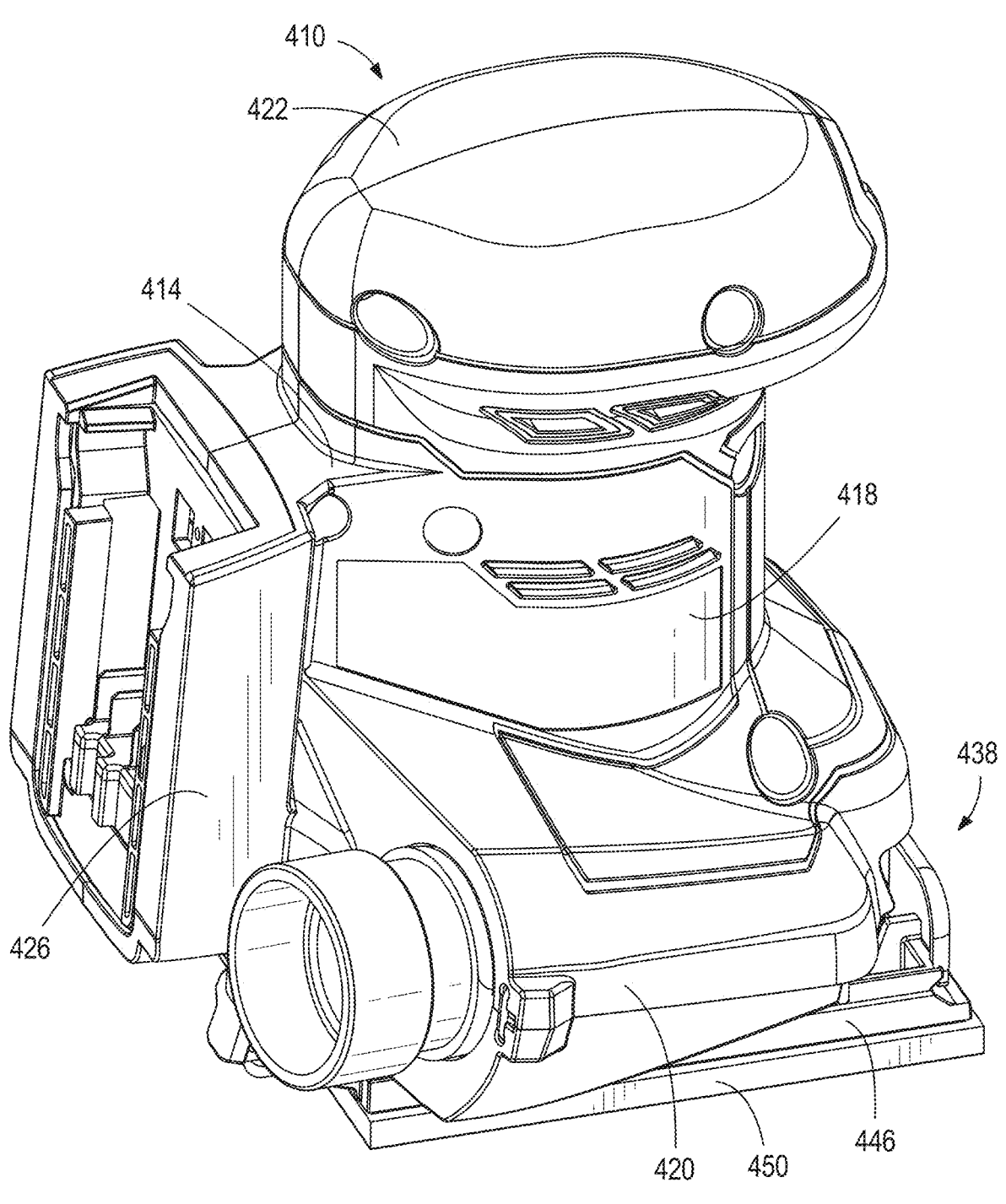
FIG. 5 illustrates a rear perspective view of the sander of FIG. 4.
Figure 6:
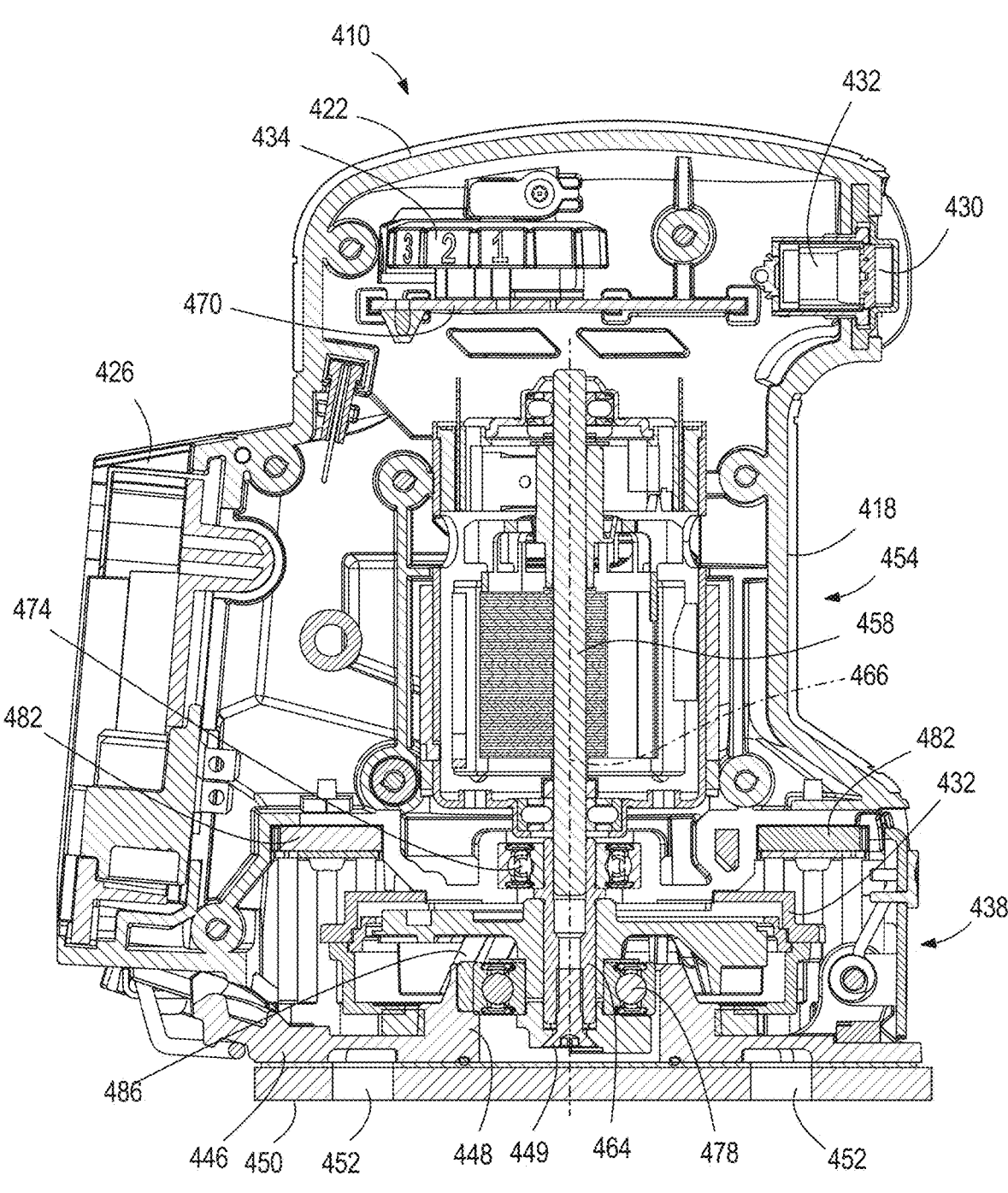
FIG. 6 illustrates a side cross-sectional view of the sander of FIG. 4.

FIGS. 4-6 illustrate an orbital sander, and in particular, a quarter sheet sander 410. The quarter sheet sander 410 includes a main housing 414 that has a motor housing portion 418 that supports a direct-drive drive unit 454 (FIG. 6). The direct-drive unit 454 includes an electric motor 458 with a drive shaft 462 that extends along a rotational axis 466 and that rotates in response to torque from the electric motor 458. The main housing 414 further includes a handle portion 422 extending from the motor housing 418 and shaped to be grasped by a hand of the user, a battery receptacle 426 for selectively receiving a battery pack to electrically power the electric motor 458, and a dust collection portion 420 that is integrated with the housing 414 and that partially houses a dust collection system 520. The handle portion 422 includes a controller 470 (e.g., a printed circuit board having one or more microprocessors and multiple field-effect transistors to drive the motor 458), a push button switch 432 electrically connected to the controller 470 to provide an input signal to the controller 470 to activate and deactivate the motor 458 in response to actuation of the switch 432, and a push button 430 that protrudes from the handle portion 422 and that is depressible by the user to actuate the switch 432. Additionally, the handle 422 includes a speed selection switch 434 that electrically communicates with the controller 470 to selectively alter the rotational speed of the motor 458.

The sheet sander 410 also includes a baseplate 446 that supports the main housing 414 and a paper retention system including a front clamp 438 and a rear clamp 442. A foam pad 450 is attached to the baseplate 446 (e.g., via screws) and supports a sanding sheet that is retained by the front and rear clamps 438, 442. As illustrated, the rear clamp 442 is located opposite the dust collection portion 420 of the housing 414 so that access to the clamp 442 is not obstructed by the dust collection portion 420. In some embodiments of the sander 410, the rear clamp 442 can be retained on the baseplate 446 within a groove 443 to only form a singular contact point between the rear clamp 442 and the baseplate 446 to secure the sanding sheet.

With continued reference to FIGS. 4-6, the drive unit 454 includes a first bearing 474 to support a top portion of the drive shaft 462 that is retained in the motor housing 418, and a second bearing 478 that supports a lower portion 464 of the drive shaft 462. The second bearing 478 is captured by a baseplate carrier 448 formed on the baseplate 446, and the lower portion 464 of the drive shaft 462 is fastened to the baseplate carrier 448 by a fastener 449 (e.g., a screw) such that the drive shaft 462 is rotatably coupled to the baseplate carrier 448. The drive unit 454 further includes a plurality of torque absorbers 482 located on the baseplate 446. The torque absorbers 482 flex and absorb the torque from the motor 458 to prevent free rotation about the rotational axis 466. A fan 486 is positioned on the lower portion 464 of the drive shaft 462 between the second bearing 478 and the drive shaft 462 to generate a sufficient suction force to draw dust and debris through a plurality of holes 452 in the baseplate 446 during operation of the sander 410.

FIG. 7 illustrates a control system 700 for the nailer 10 or the sander 410, collectively referred to as the power tool 10, 410. The control system 700 includes a controller 704. The controller 704 is be electrically and/or communicatively connected to a variety of modules or components of the power tool 10, 410. For example, the illustrated controller 704 is electrically connected to a motor 708, a battery pack interface 712, a switch 716 (connected to a trigger or ON-OFF switch 720), one or more sensors 724 (e.g., a current sensor, voltage sensor, a position sensor, speed sensors, etc.) and a temperature sensor 728, one or more indicators 732, one or more user input modules 736, a power input module 740, and a gate controller 744 (connected to an inverter 748). The motor 708 includes a rotor, a stator, and a shaft that rotates about a longitudinal axis.

The controller 704 includes combinations of hardware and software that are operable to, among other things, control the operation of the power tool 10, 410, monitor the operation of the power tool 10, 410, activate the one or more indicators 732 (e.g., an LED), etc. The gate controller 744 is configured to control the inverter 748 to convert a DC power supply to phase signals for powering the phases of the motor 708. The current sensor 724 is configured to, for example, sense a current between the inverter 748 and the motor 708. The temperature sensor is configured to, for example, sense a temperature of the inverter 748.

The controller 704 includes a plurality of electrical and electronic components that provide power, operational control, and protection to the components and modules within the controller 704 and/or the power tool 10, 410. For example, the controller 704 includes, among other things, a processing unit 752 (e.g., a microprocessor, a microcontroller, or another suitable programmable device), a memory 756, input units 760, and output units 764. The processing unit 752 includes, among other things, a control unit 768, an arithmetic logic unit ("ALU") 772, and a plurality of registers 776 (shown as a group of registers in FIG. 7), and is implemented using a known computer architecture (e.g., a modified Harvard architecture, a von Neumann architecture, etc.). The processing unit 752, the memory 756, the input units 760, and the output units 764, as well as the various modules or circuits connected to the controller 704 are connected by one or more control and/or data buses (e.g., common bus 780). The control and/or data buses are shown generally in FIG. 7 for illustrative purposes. The use of one or more control and/or data buses for the interconnection between and communication among the various modules, circuits, and components would be known to a person skilled in the art in view of the invention described herein.

The memory 756 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 752 is connected to the memory 756 and executes software instructions that are capable of being stored in a RAM of the memory 756 (e.g., during execution), a ROM of the memory 756 (e.g., on a generally permanent basis), or another non-transitory computer readable medium such as another memory or a disc. Software included in the implementation of the power tool 10, 410 can be stored in the memory 756 of the controller 704. The software includes, for example, firmware, one or more applications, program data, filters, rules, one or more program modules, and other executable instructions. The controller 704 is configured to retrieve from the memory 756 and execute, among other things, instructions related to the control processes and methods described herein. In other constructions, the controller 704 includes additional, fewer, or different components.

The battery pack interface 712 includes a combination of mechanical components (e.g., rails, grooves, latches, etc.) and electrical components (e.g., one or more terminals) configured to and operable for interfacing (e.g., mechanically, electrically, and communicatively connecting) the power tool 10, 410 with a battery pack. For example, power provided by the battery pack to the power tool is provided through the battery pack interface 712 to the power input module 740. The power input module 740 includes combinations of active and passive components to regulate or control the power received from the battery pack prior to power being provided to the controller 704. The battery pack interface 712 also supplies power to the inverter 748 to be switched by the switching FETs to selectively provide power to the motor 708. The battery pack interface 712 also includes, for example, a communication line 784 to provide a communication line or link between the controller 704 and the battery pack.

The indicators 732 include, for example, one or more light-emitting diodes ("LEDs"). The indicators 732 can be configured to display conditions of, or information associated with, the power tool 10, 410. For example, the indicators 732 are configured to indicate measured electrical characteristics of the power tool 10, 410, the status of the device, etc. The one or more user input modules 736 may be operably coupled to the controller 704 to, for example, select a forward mode of operation or a reverse mode of operation, a torque and/or speed setting for the power tool 10, 410 (e.g., using torque and/or speed switches), etc. In some embodiments, the one or more user input modules 736 may include a combination of digital and analog input or output devices required to achieve a desired level of operation for the nailer, such as one or more knobs, one or more dials, one or more switches, one or more buttons, etc. In some embodiments, the one or more user input modules 736 may receive signals wirelessly from a device external to the power tool 10, 410 (e.g., a user's mobile phone).

The controller 704 may be configured to determine whether a fault condition of the power tool 10, 410 is present and generate one or more control signals related to the fault condition. For example, the controller 704 may calculate or include, within memory 756, predetermined operational threshold values and limits for operation of the power tool 10, 410. For example, when a potential thermal failure (e.g., of a FET, the motor 708, etc.) is detected or predicted by the controller 704, power to the motor 708 can be limited or interrupted until the potential for thermal failure is reduced. In some embodiments, the power tool 10, 410 is configured to detect a stall condition of the motor 708. If the controller 704 detects one or more such fault conditions of the power tool 10, 410 or determines that a fault condition of the power tool 10, 410 no longer exists, the controller 704 may be configured to provide information and/or control signals to another component of the power tool 10, 410 (e.g. the battery pack interface 712, the indicators 732, etc.). The signals can be configured to, for example, trip or open a fuse of the nailer, reset a switch, etc.

For the nailer 10, the controller 704 and sensors 724, 728 can be used to detect workpiece proximity (e.g., is the nailer 10 abutting a surface) and readiness to fire. The temperature sensor 728 measures various temperatures of the nailer mechanics (e.g., motor, striker, drive shaft, etc., for assessing readiness to fire. The sensors 724 include, for example, voltage sensors, current sensors, speed sensors, position sensors, motions sensors (e.g., accelerometers, gyroscopes, inertial measurement units ["IMUs"], etc.) for detecting various other parameters of the nailer 10. For example, a Hall effect sensor or another position sensor can be used to detect a linear position of the striker 26 (e.g., a binary position) to correctly stop the reloading of the nailer 10 for the next fastener. As described in greater detail below, each of these sensors can be used by, for example, a machine learning controller, to detect or identify a motor stall condition.

Similarly, the sander 410 includes a heavy fan 486 that requires significant energy to initially start up using the controller 704 The controller 704 and sensors 724, 728 can be used to monitor conditions of the sander during operation (e.g., at startup). The temperature sensor 728 measures various temperatures of the sander mechanics (e.g., motor, fan, etc.). The sensors 724 include, for example, voltage sensors, current sensors, speed sensors, position sensors, motions sensors (e.g., accelerometers, gyroscopes, inertial measurement units ["IMUs"], etc.) for detecting various other parameters of the sander 410. In some embodiments, the speed of the motor 708 is varied without direct speed sensing by controlling pulse-width modulation ("PWM") signals that are applied to the inverter 748. The fan 486 moves the baseplate 446 through a bearing 474, 478 to provide oscillating motion. The fan 486, baseplate 446, and bearings 474, 478 combined mechanism has a temperature dependent resistance to motion (e.g., at colder temperatures) which can appear similar to a stall condition. The temperature sensor 728 can be used to monitor a temperature of this mechanism. In order to prevent damage to, for example, the motor 708 or a fuse, motor current for the sander 410 is limited. A higher current above a threshold level for a period of time can be indicative of a stall condition. As described in greater detail below, each of these sensors can be used by, for example, a machine learning controller, to detect or identify a motor stall condition (e.g., distinguish a stall condition from the startup condition).

Figure 8:
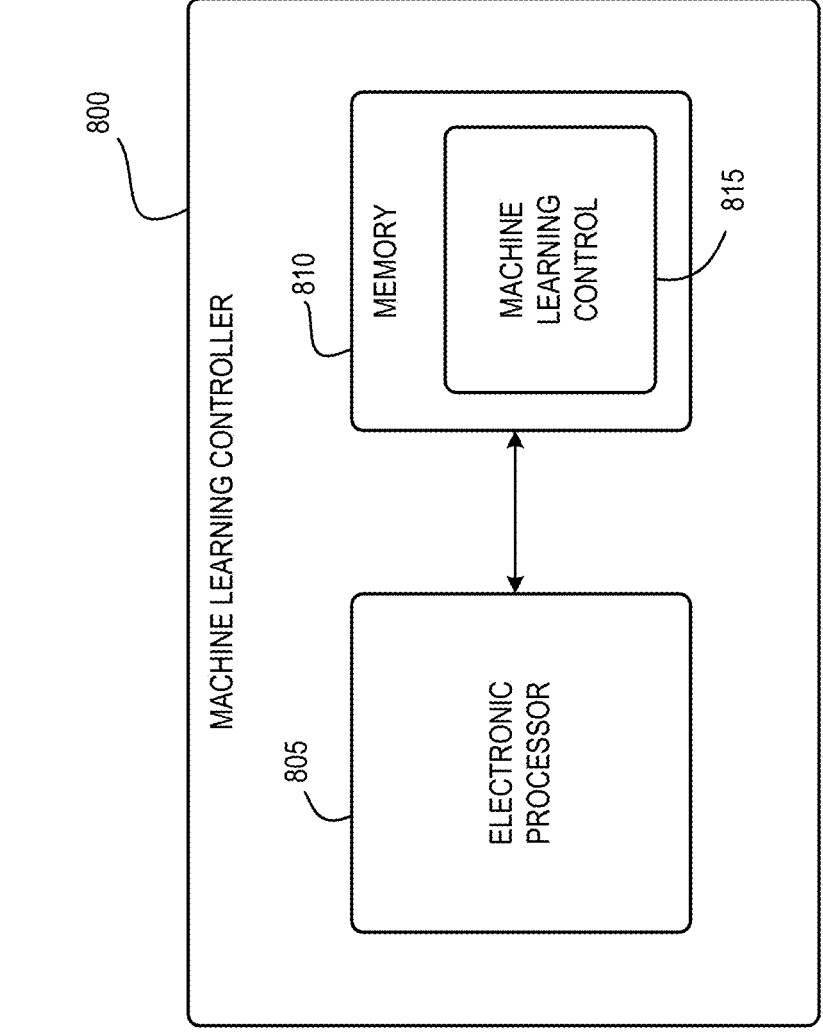
FIG. 8 illustrates a block diagram of a machine learning controller in accordance with embodiments described herein.

In some embodiments, the controller 704 includes a machine learning controller. As shown in FIG. 8, the machine learning controller 800 includes a machine learning electronic processor 805 and a machine learning memory 810. The machine learning memory 810 stores a machine learning control 815. The machine learning control 815 may include a trained machine learning program as described below. In some embodiments, the trained machine learning program is instead stored in the memory 756 of the power tool 10, 410 and implemented by the processing unit 752. The machine learning control 815 may be built and operated by the power tool 10, 410 or a remote device (e.g., a server). In other embodiments, the machine learning control 815 is built on and/or implemented by an intermediate external device, such as a phone, tablet, gateway, hub, or other power tool separate from the power tool 10, 410.

The machine learning controller 800 implements a machine learning program. For example, the machine learning controller 800 is configured to construct a model (e.g., building one or more algorithms) based on example inputs. Supervised learning involves presenting a computer program with example inputs and their actual outputs (e.g., categorizations). The machine learning controller 800 is configured to learn a general rule or model that maps the inputs to the outputs based on the provided example input-output pairs. The machine learning algorithm may be configured to perform machine learning using various types of methods. For example, the machine learning controller 800 may implement the machine learning program using decision tree learning (such as random decision forests), associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), among others, such as those listed in Table 1 below. In some embodiments the machine learning program is implemented by the controller 704, an external device, or a combination of the controller 704, an external device, and/or the machine learning controller 800.

TABLE 1

| Recurrent Models | Recurrent Neural Networks ["RNNs"], Long Short-Term Memory ["LSTM"] models, Gated Recurrent Unit ["GRU"] models, Markov Processes, Reinforcement learning |
| Non-Recurrent Models | Deep Neural Network ["DNN"], Convolutional Neural Network ["CNN"], Support Vector Machines ["SVM"], Anomaly detection (ex: Principle Component Analysis ["PCA"]), logistic regression, decision trees/forests, ensemble methods (combining models), polynomial/Bayesian/other regressions, Stochastic Gradient Descent ["SGD"], Linear Discriminant Analysis ["LDA"], Quadratic Discriminant Analysis ["QDA"], Nearest neighbors classifications/regression, naïve Bayes, attention networks, transformer networks, etc. |

The machine learning controller 800 is programmed and trained to perform a particular task. For example, in some embodiments, the machine learning controller 800 is trained to identify an application (or operation) performed by the power tool 10, 410. The training examples used to train the machine learning controller 800 may be graphs or tables of operating profiles, such as temperature, motor current, temperature over time, motor current over time, etc., for a given application. The training examples may be previously collected training examples, from, for example, a plurality of the same type of power tools. For example, the training examples may have been previously collected from a plurality of power tools of the same type (e.g., the same size blades) over a span of, for example, one year.

A plurality of different training examples is provided to the machine learning controller 800. The machine learning controller 800 uses these training examples to generate a model (e.g., a rule, a set of equations, and the like) that helps categorize or estimate the output based on new input data. The machine learning controller 800 may weight different training examples differently to, for example, prioritize different conditions or inputs and outputs to and from the machine learning controller 800. For example, certain observed operating characteristics may be weighed more heavily than others, such as temperature, motor current, temperature over time, motor current over time, etc.

In one example, the machine learning controller 800 implements an artificial neural network. The artificial neural network includes an input layer, a plurality of hidden layers or nodes, and an output layer. Typically, the input layer includes as many nodes as inputs provided to the machine learning controller 800. As described above, the number (and the type) of inputs provided to the machine learning controller 800 may vary based on the particular task for the machine learning controller 800. Accordingly, the input layer of the artificial neural network of the machine learning controller 800 may have a different number of nodes based on the particular task for the machine learning controller 800. The input layer connects to the hidden layers. The number of hidden layers varies and may depend on the particular task for the machine learning controller 800. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. However, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is associated with an activation function. The activation function defines how the hidden layer is to process the input received from the input layer or from a previous input layer. These activation functions may vary and be based on not only the type of task associated with the machine learning controller 800, but may also vary based on the specific type of hidden layer implemented.

Each hidden layer may perform a different function. For example, some hidden layers can be convolutional hidden layers which can, in some instances, reduce the dimensionality of the inputs, while other hidden layers can perform statistical functions such as max pooling, which may reduce a group of inputs to the maximum value, an averaging layer, among others. In some of the hidden layers (also referred to as "dense layers"), each node is connected to each node of the next hidden layer. Some neural networks including more than, for example, three hidden layers may be considered deep neural networks. The last hidden layer is connected to the output layer. Similar to the input layer, the output layer typically has the same number of nodes as the possible outputs.

During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, and the like. Different types of training algorithms can be used to adjust the bias values and the weights of the node connection based on the training examples. The training algorithms may include, for example, gradient descent, newton's method, conjugate gradient, quasi newton, and levenberg marquardt, among others.

In another example, the machine learning controller 800 implements a support vector machine to perform classification. The machine learning controller 800 may receive inputs from the sensors 724, 728. The machine learning controller 800 then defines a margin using combinations of some of the input variables as support vectors to maximize the margin. In some embodiments, the machine learning controller 800 defines a margin using combinations of more than one of similar input variables. The margin corresponds to the distance between the two closest vectors that are classified differently. In other embodiments, a single support vector machine can use more than two input variables and define a hyperplane that separates the types of applications.

The training examples for a support vector machine include an input vector including values for the input variables (e.g., temperature, motor current, temperature over time, motor current over time, etc.), and an output classification indicating the application performed by the power tool 10, 410. During training, the support vector machine selects the support vectors (e.g., a subset of the input vectors) that maximize the margin. In some embodiments, the support vector machine may be able to define a line or hyperplane that accurately separates the types of applications. In other embodiments (e.g., in a non-separable case), however, the support vector machine may define a line or hyperplane that maximizes the margin and minimizes the slack variables, which measure the error in a classification of a support vector machine. After the support vector machine has been trained, new input data can be compared to the line or hyperplane to determine how to classify the new input data. In other embodiments, as mentioned above, the machine learning controller 800 can implement different machine learning algorithms to make an estimation or classification based on a set of input data. For example, a random forest classifier may be used, in which multiple decision trees are implemented to observe different operational features of the power tool 10, 410. Each decision tree has its own output, and majority voting may be used to determine the final output of the machine learning controller 800.

To train the machine learning control 815, the machine learning controller 800 may be provided with a plurality of application profiles. The plurality of application profiles related to various combinations of input parameters, such as temperature, motor current, temperature over time, motor current over time, etc. The application profiles can also correspond to tables of values or other sets of numerical values that represent the application profiles. Each application profile provides, for example, a temperature, a motor current, etc. Additionally each application profile may be labelled such that the machine learning controller 800 can learn the expected profile for each application.

In embodiments where the machine learning program is implemented by the controller 704 (e.g., locally on the power tool 10, 410), the machine learning control 815 may require firmware or memory updates. Accordingly, a prompt asking a user to update the machine learning program may be provided via the indicators 736 or on a display of an external device.

The machine learning controller 800 could also be used to help determine the proper settings for the power tool 10, 410 based on combinations of any of the sensors/parameters described herein. A machine learning model can be built as described above by collecting training data that would include measured values from any available sensors. The training data would then be used to build a model to predict operational settings based on input sensor values. The model could also continue to learn and improve over time by giving the user the ability to manually adjust the control while in use. This could be useful in helping the power tool to adapt to specific user preferences. This would work by starting with a model built from a collected set of training data. The power tool 10, 410 would use that model to set operational parameters based on input sensor data. A user could then manually adjust operation as desired. These adjustments would be recorded by the controller 704 or machine learning controller 800, and then be used to adjust the model for future use.

In some embodiments, clustering is used to find similar instances of sampled data (e.g., from a catalogue of samples) that are indicative of a stall condition. Similarly, deep learning (e.g., a deep neural network) can be used to teach the neural net what a stall condition looks like, what normal operation looks like, what a cold operation looks like, and what potential misuse of the power tool 110, 410 looks like. Anomaly detection can also be used to, for example, detect only stall conditions. In such a situation, a detected abnormality would mean that the power tool 10, 410 is operating normally.

Figure 9:
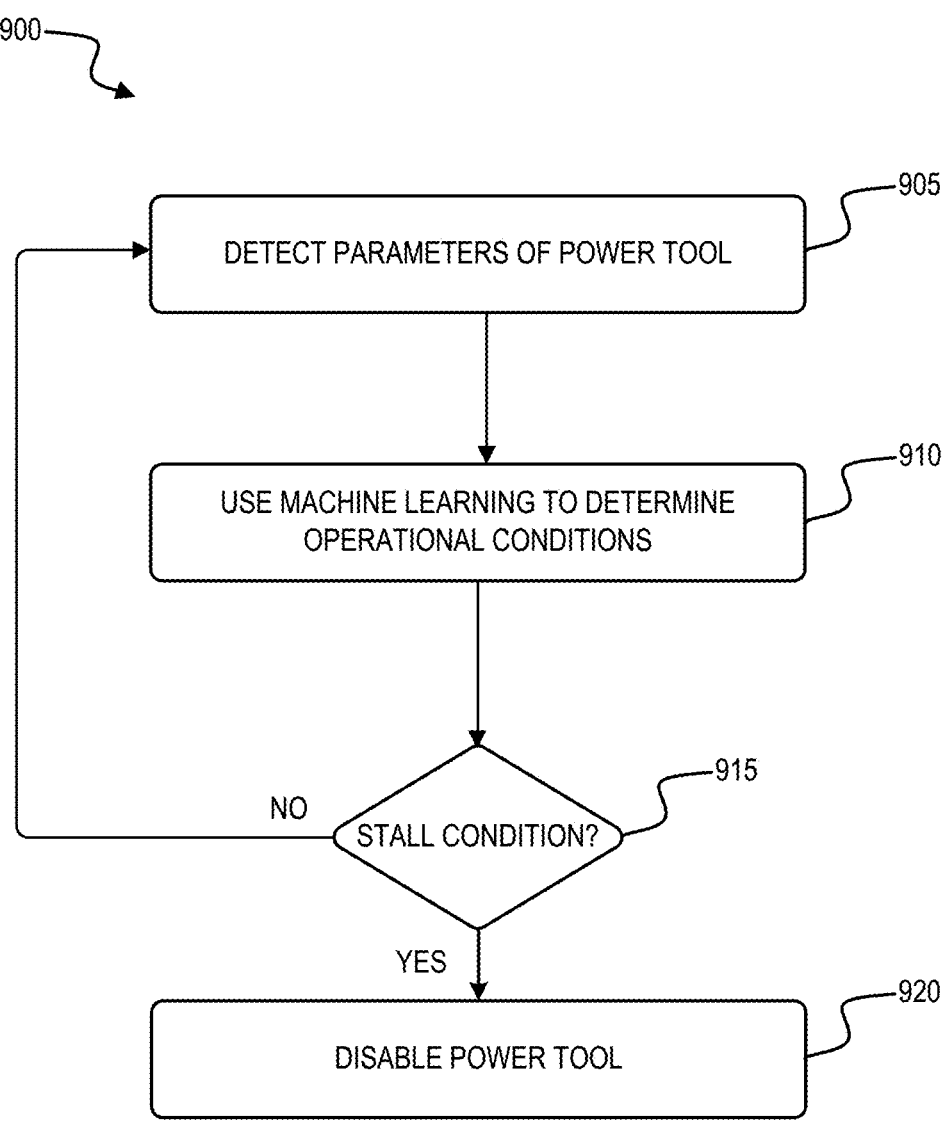
FIG. 9 illustrates a block diagram of a method of controlling the nailer of FIG. 1 or the sander of FIG. 4 in accordance with embodiments described herein.

FIG. 9 is a process 900 for controlling operation of the power tool 10, 410. The controller 704 (and/or machine learning controller 800) detect parameters of the power tool 10, 410 using any of the sensors disclosed herein (STEP 905). The controller 704 (and/or machine learning controller 800) then determines operational conditions of the power tool 10, 410 (STEP 910). The controller 704 (and/or machine learning controller 800) then determines whether the operational conditions of the power tool 10, 410 are indicative of a stall condition (STEP 915). If the controller 704 (and/or machine learning controller 800) detects a stall condition, the power tool 10, 410 is disabled (STPE 920).

Thus, embodiments described herein provide, among other things, stall detection for a power tool using a machine learning controller. Various features and advantages are set forth in the following claims.

13

14

What is claimed is:

1. A power tool comprising:

a housing;

a motor supported by the housing;

an inverter;

a battery pack interface configured to receive a battery pack;

a plurality of sensors configured to generate sensor data indicative of an operational state of the power tool, the plurality of sensors including a temperature sensor configured to sense a temperature associated with the inverter; and an electronic controller including an electronic processor and a memory, the memory including a machine learning control program for execution by the electronic processor, the electronic controller configured to:

receive the sensor data indicative of the operational state of the power tool, process the sensor data using the machine learning control program to determine whether the power tool is experiencing a stall condition, process the sensor data using the machine learning control program to distinguish between the stall condition and a cold startup operation, and disable the motor when the power tool is determined to be experiencing the stall condition.

2. The power tool of claim 1, wherein the power tool is a fastener driver.

3. The power tool of claim 2, wherein the plurality of sensors includes a motion sensor.

4. The power tool of claim 3, wherein the motion sensor is selected from a group consisting of an accelerometer, a gyroscope, and an inertial measurement unit.

5. The power tool of claim 1, wherein the power tool is a sander.

6. The power tool of claim 5, wherein the plurality of sensors includes a motion sensor.

7. A method of operating a power tool comprising:

generating, by a plurality of sensors, sensor data indicative of an operational state of the power tool, the plurality of sensors including a temperature sensor configured to sense a temperature associated with an inverter of the power tool;

receiving, by an electronic controller of the power tool, the sensor data indicative of the operational state of the power tool;

processing, by the electronic controller of the power tool, the sensor data using a machine learning control program to determine whether the power tool is experiencing a stall condition;

processing, by the electronic controller of the power tool, the sensor data using the machine learning control program to distinguish between the stall condition and a cold startup operation; and disabling a motor of the power tool when the power tool is determined to be experiencing the stall condition.

8. The method of claim 7, wherein the power tool is a fastener driver.

9. The method of claim 8, wherein the plurality of sensors include a motion sensor.

10. The method of claim 9, wherein the motion sensor is selected from a group consisting of an accelerometer, a gyroscope, and an inertial measurement unit.

11. The method of claim 7, wherein the power tool is a sander.

12. The method of claim 11, wherein the plurality of sensors includes a motion sensor.

13. A power tool comprising:

a housing;

a motor supported by the housing;

an inverter;

a battery pack interface configured to receive a battery pack;

a plurality of sensors configured to generate sensor data indicative of an operational state of the power tool, the plurality of sensors including a temperature sensor configured to sense a temperature associated with the inverter, a current sensor, a speed sensor, and a motion sensor; and an electronic controller including an electronic processor and a memory, the memory including a machine learning control program for execution by the electronic processor, the electronic controller configured to:

receive the sensor data indicative of the operational state of the power tool, process the sensor data using the machine learning control program to determine whether the motor is experiencing a stall condition, process the sensor data using the machine learning control program to distinguish between the stall condition and a cold startup operation, and disable the motor when the motor is determined to be experiencing the stall condition.

14. The power tool of claim 13, wherein the power tool is a fastener driver.

15. The power tool of claim 14, wherein the plurality of sensors include a voltage sensor.

16. The power tool of claim 13, wherein the power tool is a sander.

17. The power tool of claim 13, wherein the machine learning controller program implements one or more of a group consisting of a decision tree learning, an artificial neural network, a recurrent artificial neural network, a long short term memory neural network, a support vector machine, clustering, a Bayesian network, reinforcement learning, representation learning, similarity and metric learning, sparse dictionary learning, and k-nearest neighbor.

* * * * *